United States Patent [19]

Miyagi et al.

[11] 4,291,656

[45] Sep. 29, 1981

[54] METHOD OF CONTROLLING THE ROTATIONAL SPEED OF AN INTERNAL COMBUSTION ENGINE

[75] Inventors: Hideo Miyagi, Toyota; Jiro Nakano, Okazaki, both of Japan

[73] Assignee: Toyota Jidosha Kogyo Kabushiki Kaisha, Toyota, Japan

[21] Appl. No.: 55,365

[22] Filed: Jul. 6, 1979

[30] Foreign Application Priority Data

Jul. 14, 1978 [JP] Japan .................................. 53-85239

[51] Int. Cl.[3] ........................ F02D 11/10; B60K 31/00

[52] U.S. Cl. .................................... 123/320; 123/324; 123/352; 123/339

[58] Field of Search ............... 123/320, 324, 326, 403, 123/339, 352

[56] References Cited

U.S. PATENT DOCUMENTS 3,868,933 3/1975 Bigalke et al. ...................... 123/320

4,211,193 7/1980 Cox et al. ........................... 123/352

*Primary Examiner*—Charles J. Myhre

*Assistant Examiner*—Raymond A. Nelli

*Attorney, Agent, or Firm*—Kenyon & Kenyon

[57] ABSTRACT

The flow rate of intake air sucked into an internal combustion engine when a throttle valve of the engine is at the idling position is controlled so that the actual rotational speed of the engine becomes equal to a desired value. This desired value of the rotational speed of the engine is adjusted in accordance with the result of a judgement as to whether the actual rotational speed of the engine is increasing or decreasing, and the value of the actual rotational speed of the engine.

6 Claims, 10 Drawing Figures

METHOD OF CONTROLLING THE ROTATIONAL SPEED OF AN INTERNAL COMBUSTION ENGINE

BACKGROUND OF THE INVENTION

The present invention relates to a feedback control method of controlling the rotational speed of an internal combustion engine.

There is known a method of controlling the rotational speed of an internal combustion engine in the idling condition or the decelerating condition, which involves controlling the flow rate of intake air sucked into the engine when the engine is in the idling condition or the decelerating condition, namely, when a throttle valve disposed in an intake passage of the engine is at the idling position. According to this conventional method, the flow rate of intake air is controlled by adjusting the sectional area of a flow passage or the opening time period of a flow passage, by means of a control valve disposed in a bypass passage which communicates the intake passage at a position located upstream of the throttle valve to the intake passage at a position located downstream of the throttle valve.

The control valve is adjusted in accordance with a feedback signal indicating the difference between the detected actual rotational speed of the engine and a desired rotational speed in the idling conditiion or the decelerating condition. This feedback control operation of the flow rate of intake air is carried out not only in the idling condition or the decelerating condition of the engine but, also, in the ordinary driving condition of the engine.

However, in the above-mentioned conventional method, since the desired valve of the rotational speed of the engine is always maintained at a constant value, a satisfactory feedback control operation for controlling the rotational speed of the engine cannot be expected. That is, when the actual rotational speed of the engine is abruptly decreased passing through the desired value of the rotational speed, the rotational speed of the engine overshoots below the desired value to a considerable extent. Particularly, in the case where the desired value of the rotational speed is very low, for example, lower than 700 rpm, an abrupt decrease of the rotational speed passing through the desired value of the rotational speed often causes the engine to stall. On the other hand, when the engine is rotated at or above the rotational speed of the desired value, for example at or above 700 rpm, since the rotational speed of the engine is forcebly controlled to decrease to the desired value, acceleration of the engine cannot be accomplished with good response characteristics, in other words, acceleration feeling of the engine is poor.

SUMMARY OF THE INVENTION

It is, therefore, an object of the present invention to provide a method of controlling the rotational speed of an internal combustion engine, whereby the engine is prevented from stalling when the rotational speed thereof is abruptly decreased.

Another object of the present invention is to provide a method of controlling the rotational speed of an internal combustion engine, whereby good acceleration can be obtained when the rotational speed is increased.

According to the present invention, a method of controlling the rotational speed of an internal combustion engine comprises the steps of: generating a rotational speed signal having a value corresponding to the actual rotational speed of the engine; judging whether the actual rotational speed of the engine is increasing or decreasing, by comparing the value of the generated rotational speed signal with the value of the rotational speed signal which was previously generated; adjusting a desired value of the rotational speed of the engine in accordance with the value of the generated rotational speed signal and the result of the above-mentioned judgement, and; controlling the flow rate of intake air sucked into the engine via a bypass passage which communicates an intake passage of the engine at a position located upstream of a throttle valve with the intake passage at a position located downstream of the throttle valve, so that the valve of the generated rotational speed signal approaches a value corresponding to the adjusted desired value of the rotational speed.

The above and other related objects and features of the present invention will become more apparent from the description set forth below, with reference to the accompanying drawings, and from the appended claims.

DETAILED DESCRITION OF THE PREFERRED EMBODIMENT

Figure 1:
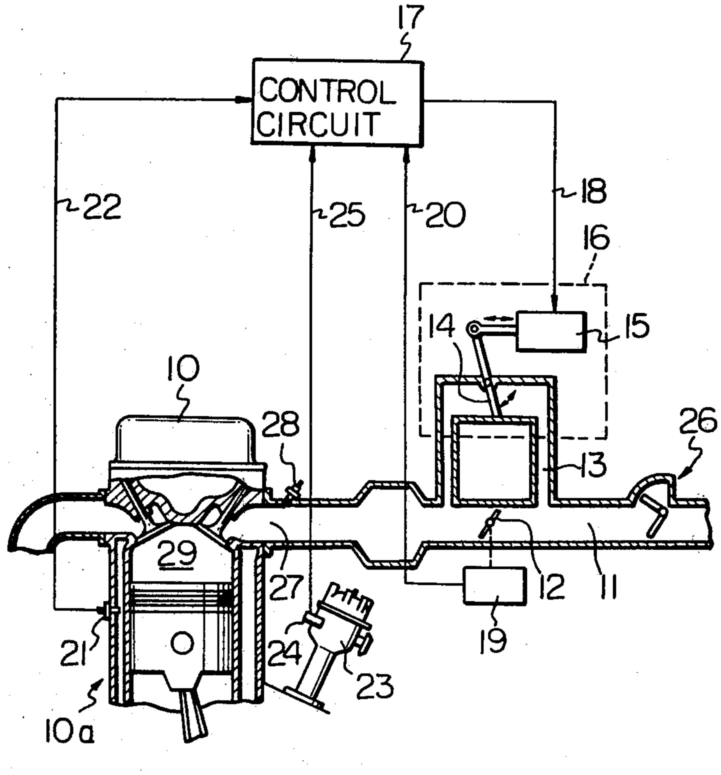
FIG. 1 is a schematic diagram illustrating an embodiment of the present invention.

Referring to FIG. 1, which is a schematic diagram illustrating an electronic control fuel injection type internal combustion engine according to the present invention, reference numeral 10 denotes an engine body, and reference numeral 11 denotes an intake passage of the engine. A throttle valve 12 is disposed in the intake passage 11. A bypass passage 13 is disposed to communicate the intake passage at a position located upstram of the throttle valve 12 with the intake passage at a position located downstream of the throttle valve 12. A control valve 14 is disposed in the bypass passage 13 for controlling the sectional area of the flow passage of the bypass passage 13. An actuator 15 of the control valve 14 is energized by a driving signal fed from a control circuit 17 via a line 18.

Various structures other than that illustrated in FIG. 1 may be adopted for a flow rate control mechanism 16 including the control valve 14 and the actuator 15 thereof. These structures will be described hereinafter with reference to FIG. 8.

Referring again to FIG. 1, a throttle position sensor 19 is attached to the shaft of the throttle valve 12 to detect when the throttle valve 12 is at the idling position, and a detected signal of the throttle position sensor 19 is fed to the control circuit 17 via a line 20. A water temperature sensor 21 is mounted on a cylinder block 10*a* of the engine to detect the temperature of engine coolant, and a temperature signal of the sensor 21 is fed to the control circuit 17 via a line 22. A speed sensor 24 for generating a digital signal indicating the rotational speed of the engine from an ignition signal is disposed on a distributor 23 of the engine, and the digital speed signal of the sensor 24 is fed to the control circuit 17 via a line 25.

As is well known, in an electronic control fuel injection type internal combustion engine, the flow rate of intake air sucked into the engine is detected by an air flow sensor 26 disposed in the intake passage 11, and fuel is supplied in an amount in accordance with the detected flow rate of intake air into a combustion chamber 29 of the engine from a fuel injection valve 28 mounted in an intake manifold portion 27. Accordingly, the rotational speed of the engine can be controlled by controlling the flow rate of intake air by the throttle valve 12 and/or control valve 14.

Figure 2:
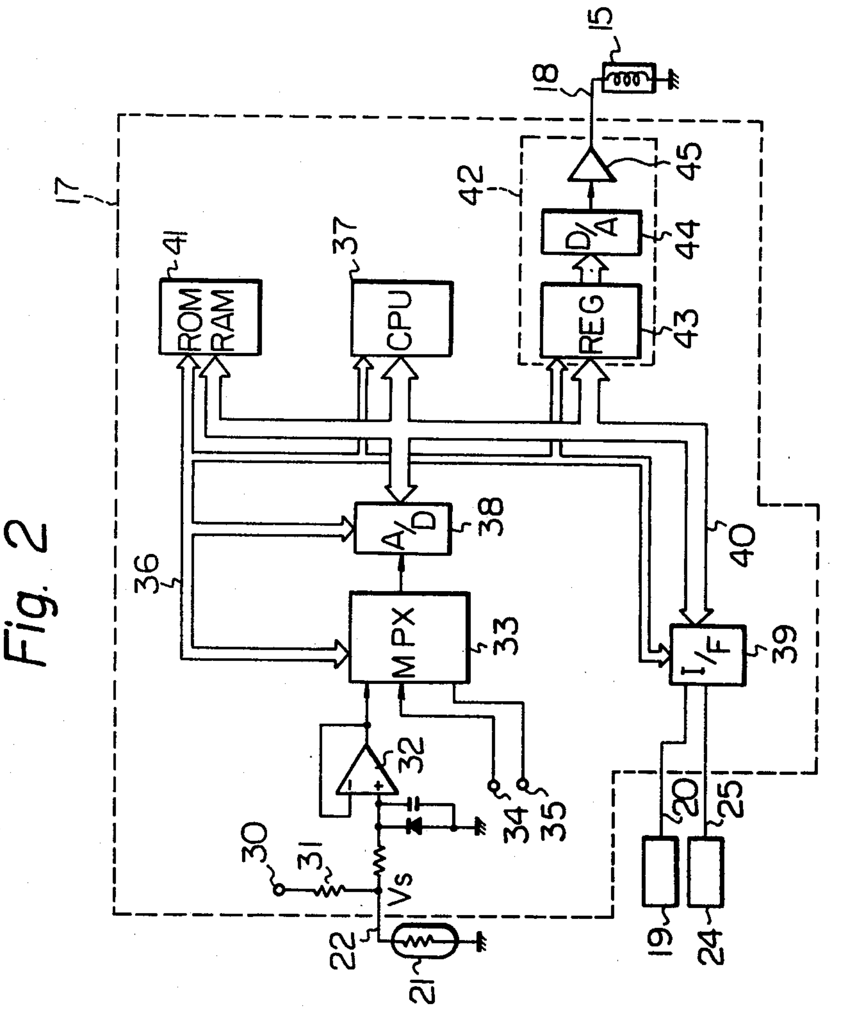
FIG. 2 is a block diagram illustrating a control circuit in the embodiment of FIG. 1.

FIG. 2 is a block diagram of the control circuit 17 in FIG. 1. In this embodiment, a stored program type digital computer is used as the control circuit 17. In FIG. 2, the water temperature sensor 21 is a temperature-sensitive resistance element, for example, a thermistor, and a certain standard voltage is applied to a terminal 30. Accordingly, a voltage determined by the division ratio between the resistance value of a resistor 31 and the resistance value across the terminals of the sensor (thermistor) 21 to this standard voltage is applied as an engine temperature signal $V_s$ to an analog multiplexer 33 (MPX) via a buffer amplifier 32. Various analog signals indicating the driving conditions of the engine are applied to the analog multiplexer 33 via terminals 34 and 35. These analog signals including the temperature signal $V_s$ are supplied in the time-division manner, to an analog-digital converter 38 (A/D) in response to control signals from a central processing unit 37 (CPU) via a control bus 36 and, then, the analog signals are converted to digital signals. The above-mentioned various signals, except for the temperature signal, are used for controlling, for example, the amount of fuel fed into the engine.

The detected signal of the throttle position sensor 19, that is, a signal indicating that the throttle valve is at the idling position, namely, that the engine is in the idling condition or in the decelerating condition, is applied to an input interface circuit 39 (I/F) via the line 20. A digital speed signal indicating the rotational speed of the engine, which is fed from the speed sensor 24, is applied to the input interface circuit 39 via the line 25.

Figure 5:
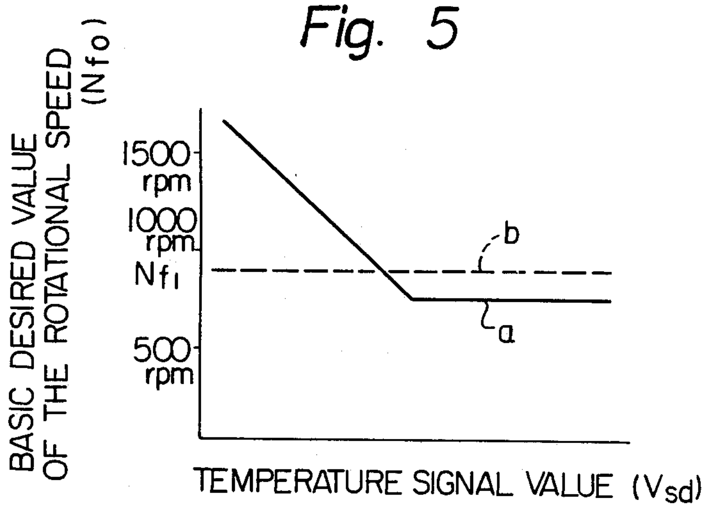
FIGS. 5 and 6 are graphs with the desired rotational speed of the engine versus the value of engine temperature signal plotted thereon.
Figure 6:
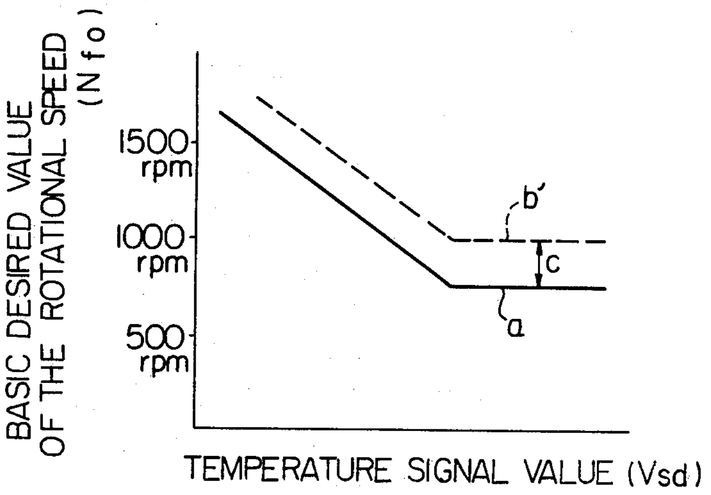

In FIG. 2, reference numeral 40 denotes an address and data bus and reference numeral 41 denotes a memory composed of ROM and RAM. In the ROM, data or approximate equations indicating relationships between the basic desired value $N_{f0}$ of the rotational speed and the value of the temperature signal $V_{sd}$ which are shown in FIGS. 5 and 6, maximum desired value $N_{fmax}$ of the rotational speed, various coefficients $N_{f1}$, A, B, C, D, E which are experimentally obtaned, and a control program are preliminarily stored.

Furthermore, in FIG. 2, reference numeral 42 denotes an output interface circuit which includes an output register 43 (REG) receiving control output data via the data bus 40, a digital-analog converter 44 (D/A) performing digital-analog conversion of control output data and an amplifier 45 for amplifying converted analog signals. The output of the amplifier 45, that is, a driving signal, is applied to the above-mentioned actuator 15 via the line 18 to energize the actuator 15.

Operations of the control circuit 17 will now be described with reference to FIG. 2 and the flow charts of FIGS. 3 and 4. Main flows of the control program stored in the memory 41 are diagrammatically illustrated in FIGS. 3 and 4, respectively, and the control circuit 17, that is, the computer, operates along these flows.

Figure 3A:
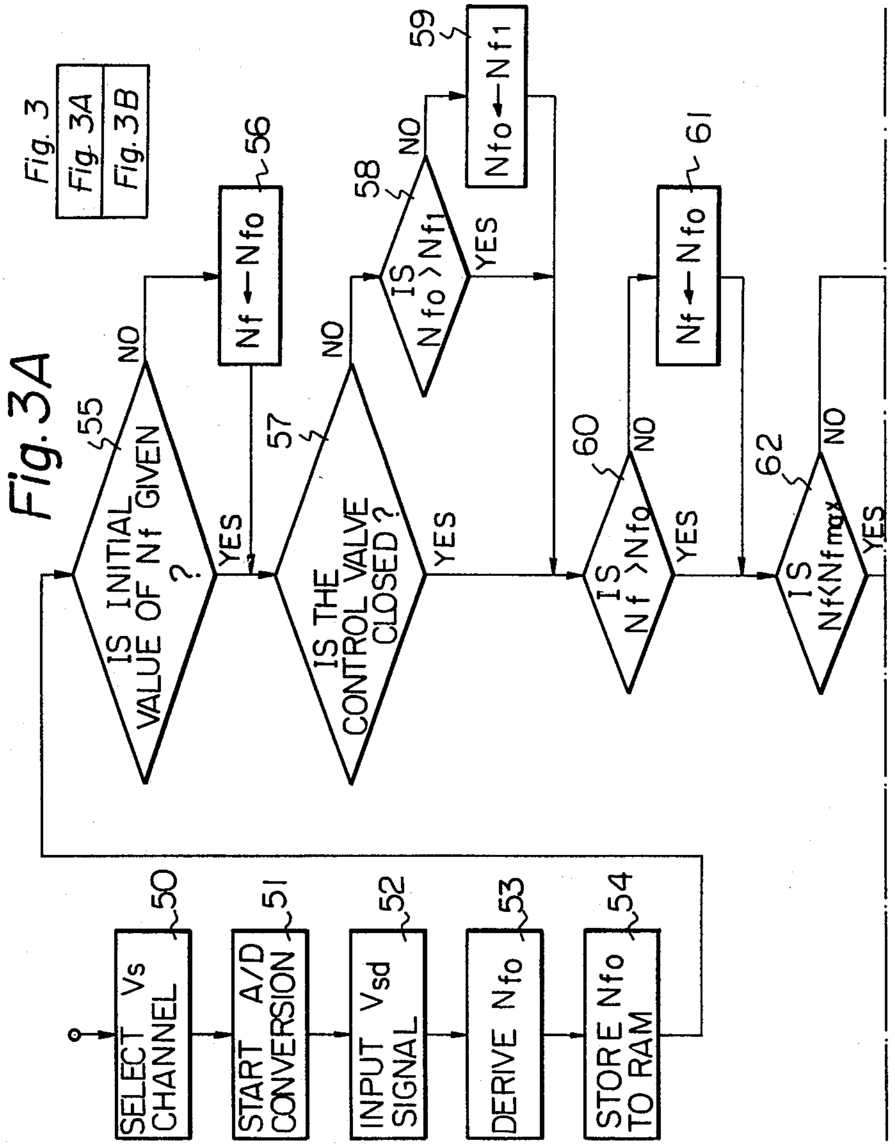
FIGS. 3*a,* 3*b* and 4*a* and 4*b* are flow charts illustrating operations of the control circuit of FIG. 2.
Figure 3B:
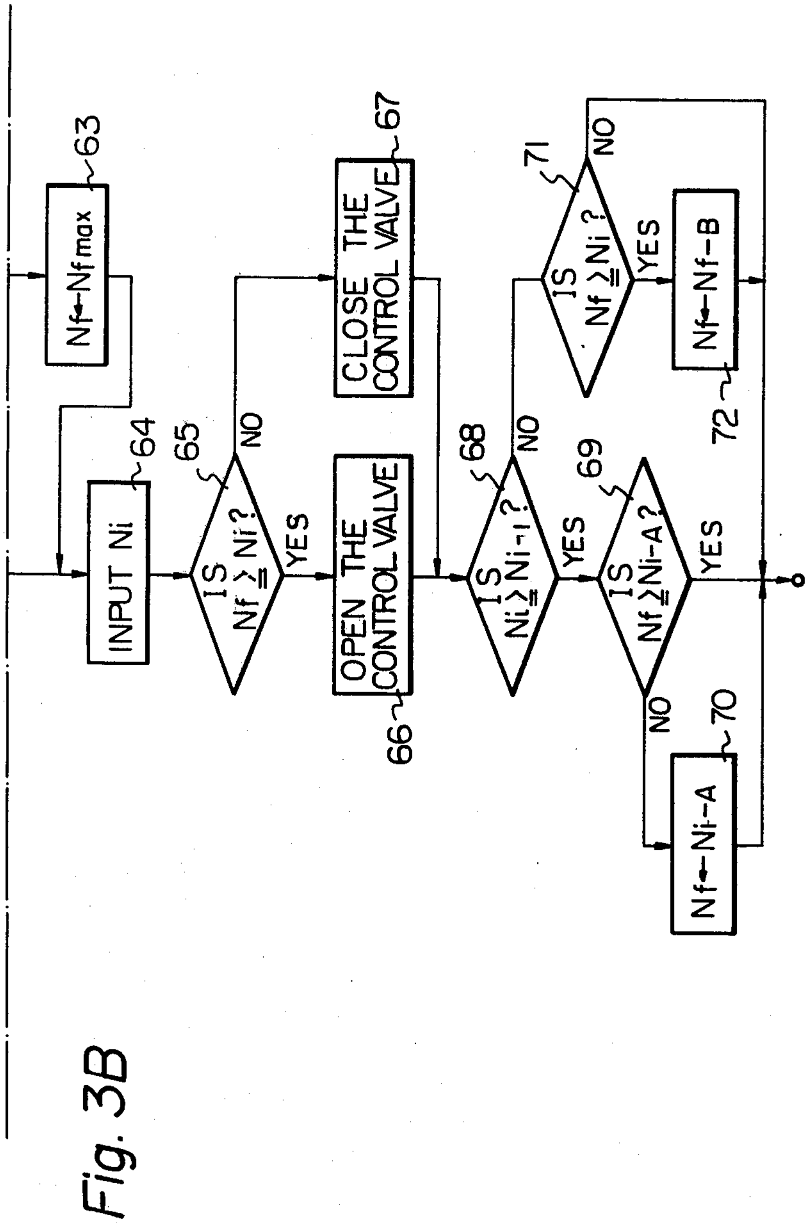

Referring to FIG. 3, every time a predetermined time interval, for example, 51.2 msec, elapses, the CPU 37 instructs selection of a channel of the temperature signal $V_s$ to the analog multiplexer 33 at a point 50. Then, the CPU instructs start of A/D conversion of the temperature signal $V_s$ to the A/D converter 38 at a point 51. The obtained digital temperature signal $V_{sd}$ is taken into the CPU 37 via the data bus 40 (point 52).

A specific relationship between the value of the temperature signal $V_{sd}$ and a basic desired value $N_{f0}$ of the rotational speed, as shown by a solid line a in FIG. 5, is preliminarily stored in the ROM of the memory 41. At points 53 and 54, the CPU 37 derives from the ROM the basic desired value $N_{f0}$ of the rotational speed corresponding to the obtained temperature signal $V_{sd}$, and then, temporarily stores the value $N_{f0}$ in the RAM. Then, at a point 55, the CPU 37 judges whether a desired value $N_f$ of the rotational speed of the engine is initially set or not. If the desired value $N_f$ has already been set, the operation flow advances to a point 57. Contrary to this, if the desired value $N_f$ has not been set yet, the initial value of $N_f$ is made equal to the basic desired value $N_{f0}$ of the rotational speed, for example, equal to a value corresponding the rotational, speed value of 700 rpm, at a point 56 and the operation flow then proceeds to the point 57.

At the point 57, the CPU 37 judges whether a signal indicating that the engine is in the idling or decelerating condition is applied from the throttle position sensor 19 or not. In the case where the signal is applied from the throttle position sensor 19, namely, the throttle valve 12 is fully closed, the operation flow proceeds to a point 60. In the case where the throttle valve 12 is not fully closed, the operation flow proceeds to points 58 and 59. At the points 58 and 59, the basic desired value $N_{f0}$ of the rotational speed, which value $N_{f0}$ is obtained at the point 53 and is equal to the minimum desired value of the rotational speed, is compared with a value $N_{f1}$ corresponding to a value indicated by a broken line b in FIG. 5, and; then, the basic desired value $N_{f0}$ is made equal to the larger value among the value $N_{f0}$ and the value $N_{f1}$. Namely, at the points 58 and 59, the basic desired value $N_{f0}$ is corrected so as to be equal to the larger value among a value $N_{f1}$, indicated by the broken line b in FIG. 5, and a value $N_{f0}$, indicated by a solid line a in FIG. 5. According to the above-described treatment at the points 58 and 59, the acceleration of the engine can be improved when the engine is accelerated from a specific engine condition wherein the rotational speed thereof is at or near the idling speed value and, also, near the desired rotational speed value.

Then, at point 60, the CPU 37 judges whether the desired value $N_f$ of the rotational speed is larger than the minimum value thereof, namely, larger than the basic desired value $N_{f0}$, or not. In the case where $N_f \leqq N_{f0}$, the value $N_f$ is made equal to the value $N_{f0}$ at a point 61. At a point 62, the CPU 37 judges whether the desired value $N_f$ of the rotational speed is smaller than the maximum value $N_{fmax}$ thereof or not. In the case where $N_f \geqq N_{fmax}$, the value $N_f$ is made equal to the value $N_{fmax}$ at a point 63, and then, the operation flow advances to a next point 64. As a result, by the processes from the point 60 to the point 63, the desired value $N_f$ of the rotational speed is controlled so that it is within a predetermined range, which is indicated as $N_{f0} \leqq N_f \leqq N_{fmax}$.

At the next point 64, the CPU 37 takes in an actual rotational signal which indicates the actual rotational speed $N_i$ of the engine and is fed from the rotational speed sensor 24. Then, at a point 65, this input value $N_i$ corresponding to the actual rotational speed is compared with the desired value $N_f$. In the case where $N_f \geqq N_i$, the operation flow advances to a point 66 and a control output data for decreasing the opening degree of the control valve 14 is fed to the output interface circuit 42. In the case where $N_f < N_i$, the operation flow advances to a point 67 and a control output data for increasing the opening degree of the control valve 14 is fed to the output interface circuit 42.

The control output data applied to the output interface circuit 42 is D/A converted to produce a driving signal having a voltage value corresponding to the value of the control output data, and the driving signal is applied to the actuator 15. The actuator 15 controls the opening degree of the control valve 14 according to the voltage value of the applied driving signal. Thus, the flow rate of sucked air passing through the bypass passage 13 and fed to the combustion chamber 29 corresponds to the value of the control output data. That is, if $N_f \geqq N_i$, the flow rate of sucked air passing through the bypass passage 13 is caused to increase, and contrary to this, if $N_f < N_i$, the flow rate is caused to decrease.

Then at a point 68, the actual rotational speed $N_{i-1}$ in the preceeding operation cycle is derived from the RAM and compared with the new actual rotational speed $N_i$ of this operation cycle. In the case where $N_i \geqq N_{i-1}$, that is when the actual rotational speed of the engine is increasing, the operation flow advances to a point 69. At the point 69, the CPU 37 judges whether the difference between the actual rotational speed value $N_i$ and the desired rotational speed value $N_f$ is larger than a predetermined value A or not. In the case where $N_f \geqq N_i - A$, one operation cycle is over after these values $N_f$ and $N_i$ are stored in the RAM. In the case where $N_f < N_i - A$, the operation flow proceeds to a point 70 and the value $N_f$ is made equal to the value $N_i - A$. Then, one operation cycle is completed after these values $N_f$ and $N_i$ are stored in the RAM.

In the case where $N_i < N_{i-1}$ at the point 68, that is, when the actual rotational speed of the engine is decreasing, the operation flow advances to a point 71 and judgement whether the actual rotational speed value $N_i$ is larger than the desired rotational speed value $N_f$ or not is carried out. In the case where $N_f < N_i$, one operation cycle is over after storing the values $N_f$ and $N_i$ in the RAM. In the case where $N_f \geqq N_i$, the operation flow advances to a point 72 and the value $N_f$ is reduced by a predetermined value B. Thereafter, the values $N_f$ and $N_i$ are stored in the RAM and, then, one operation cycle is over. The above-mentioned operation cycles are repeated at uniform time intervals, wherby the desired value $N_f$ of the rotational speed of the engine is conveniently controlled, and thus, according to the present invention, various desirable effects, which will be apparent from explanation set forth hereinafter with reference to FIG. 7, can be obtained.

Figure 7:
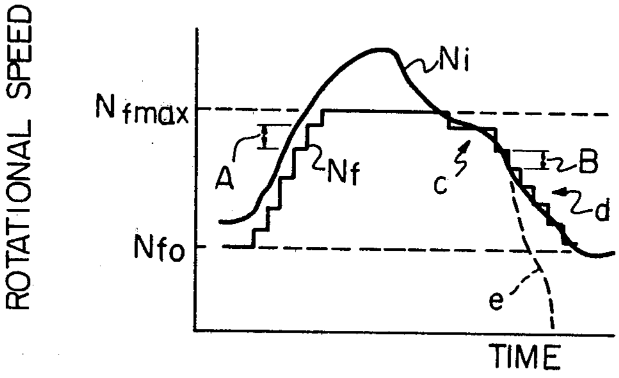
FIG. 7 is a graph with the rotational speed of the engine versus time plotted thereon.

In FIG. 7, the abscissa indicates time and the ordinate indicates the rotational speed of the engine. Furthermore, in FIG. 7, a solid line $N_i$ denotes the actual value of the rotational speed of the engine and another solid line $N_f$ denotes the desired value of the rotational speed of the engine.

As a result of the above-mentioned control procedure corresponding to the points 60 to 63 of the operation flow shown in FIG. 3, the desired value $N_f$ of the rotational speed can be always controlled so that it is within the predetermined range between the maximum value $N_{fmax}$ and the minimum value $N_{f0}$, irrespective of changes in the actual rotational speed $N_i$ of the engine, as shown in FIG. 7.

When the actual rotational speed $N_i$ is increasing, since the desired value $N_f$ is controlled in accordance with the equation of $N_i - N_f \leqq A$, as mentioned hereinbefore, the higher the actual rotational speed $N_i$ in the accelerating condition of the engine, the higher, but only to the value $N_{fmax}$, the desired rotational speed value $N_f$ becomes, as shown in FIG. 7. Accordingly, the acceleration of the engine can be extremely improved according to the present invention.

On the other hand, when the actual rotational speed value $N_i$ is decreasing and the desired value $N_f$ is smaller than the actual value $N_i$, the desired value $N_f$ is maintained without change, as shown by c in FIG. 7. When the actual rotational speed value $N_i$ is decelerating and the desired value $N_f$ is larger than or equal to the actual value $N_i$, the desired value $N_f$ is reduced by the predetermined value B in each operation cycle, as shown by d in FIG. 7. Therefore, when the actual value $N_i$ of the rotational speed decreases rapidly from a value higher than the maximum desired value $N_{fmax}$ by, for example, racing the engine, since the desired value $N_f$ is at first set at the maximum desired value $N_{fmax}$ and, then, reduced according to the decrease of the actual value $N_i$, the actual rotational speed of the engine can be closely controlled. Accordingly, the occurrence of such troubles that the rotational speed of the engine is overshot below the minimum desired value $N_{f0}$, shown by a broken line e in FIG. 7, can be effectively prevented.

Figure 4A:
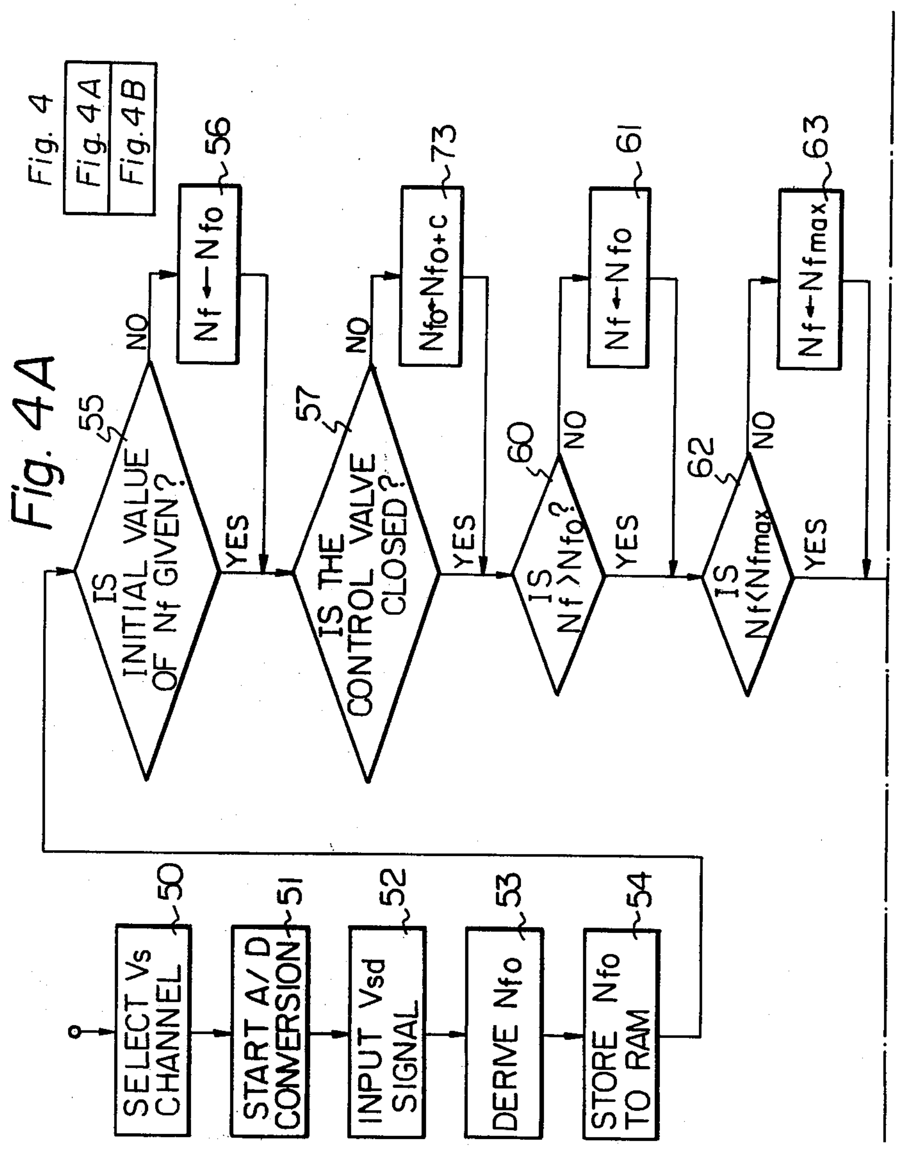
Figure 4B:
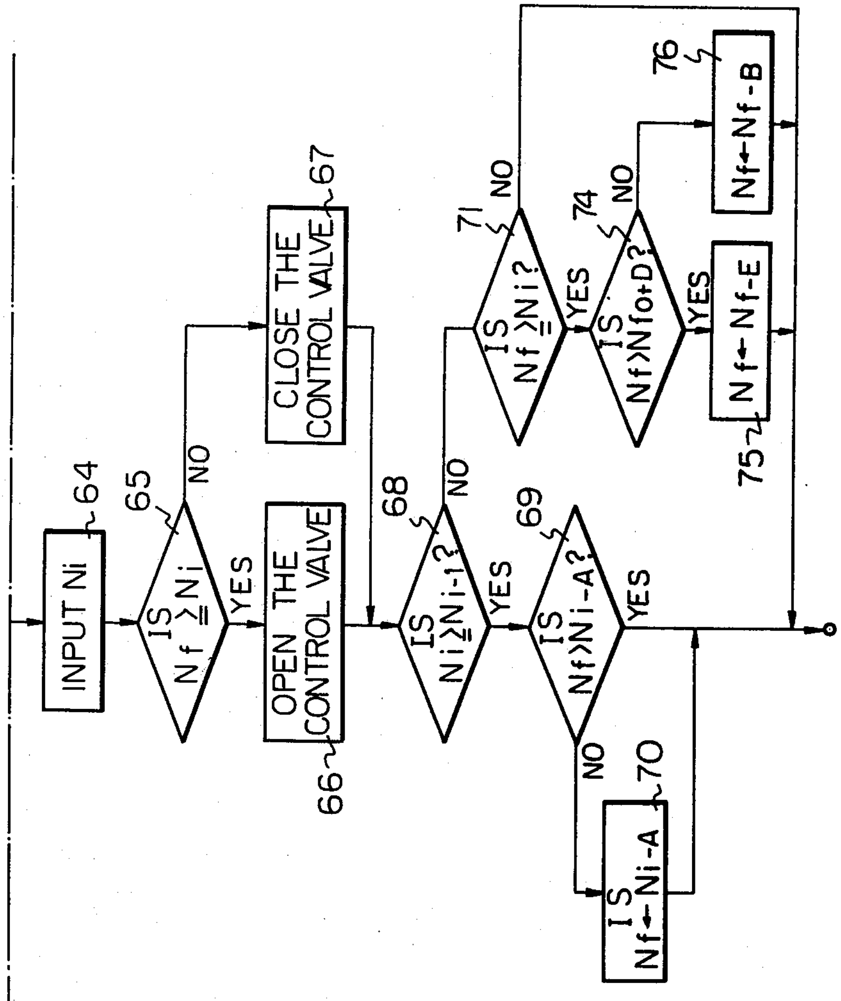

FIG. 4 illustrates another flow chart of a control program stored in the memory 41, according to the present invention. The operation flows of the control program, shown in FIG. 4, are almost the same as those shown in FIG. 3, except for the operation flow at the points 58 and 59 and the operation flow at the point 72, in the flow chart shown in FIG. 3.

In the control program shown in FIG. 4, the operation flow advances to a point 73 when an operating condition where the throttle valve 12 is not fully closed is detected at the point 57. Then, at the point 73, the basic desired value $N_{f0}$, that is, the minimum desired value of the rotational speed, is increased by an experimentally determined value C. As a result, the minimum desired value $N_{f0}$ of the rotational speed is made equal to the value corresponding to a broken line b' in FIG. 6, whereby the acceleration from the idling condition or the decelerating condition can be improved.

Furthermore, according to the control program of FIG. 4, in the case where $N_f \geqq N_i$ at the point 71, the operation flow advances to a point 74. At the point 74, the CPU 37 judges whether or not the desired value $N_f$ is larger than a value corresponding to the sum of the minimum desired value $N_{f0}$ and an experimentally determined value D, namely a value of $N_{f0} + D$. In the case where $N_f > N_{f0} + D$, the operation flow proceeds to a point 75 and, contrary to this, in the case where $N_f \leqq N_{f0} + D$, the operation flow proceeds to a point 76. At the point 75, the desired value $N_f$ is reduced by a predetermined value E, which is experimentally determined and is different from the value B. Then, one operation cycle is over after the values $N_f$ and $N_i$ are stored in the RAM. At the point 76, as well as at the point 72 in the operation flow of FIG. 3, the desired value $N_f$ is reduced by the predetermined value B. Then, after the values $N_f$ and $N_i$ are stored in the RAM, one operation cycle is over. As mentioned hereinbefore, according to the control program shown in FIG. 4, the desired value $N_f$ of the rotational speed of the engine is controlled so as to decrease by a variable degree which is determined in accordance with the desired value $N_f$ itself. Therefore, according to the control program of FIG. 4, the rotational speed of the engine can be controlled more accurately. Other effects of the operation according to the control program shown in FIG. 4 are the same as that according to the control program of FIG. 3.

Figure 8:
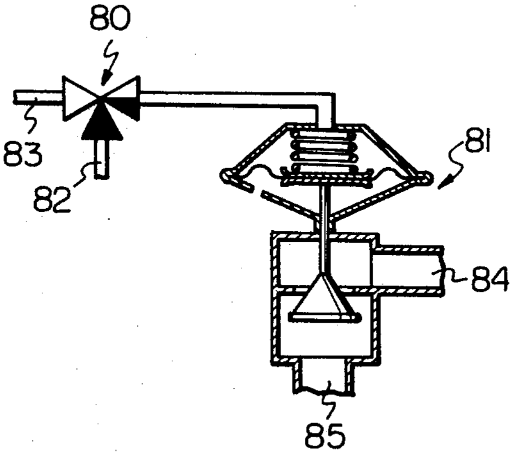
FIG. 8 is schematic diagram illustrating an engine of the structure of flow rate control mechanism.

Another example of the flow rate control mechanism 16 described in the above embodiment will now be described with reference to FIG. 8. In FIG. 8, reference numeral 80 denotes an electromagnetic valve, corresponding to the actuator 15 shown in FIG. 1, and reference numeral 81 denotes a diaphragm type flow rate control valve, corresponding to the control valve 14 shown in FIG. 1. A port 82 of the electromagnetic valve 80 is open to the atmosphere, and a port 83 is communicated with the intake manifold of the engine. A port 84 of the flow rate control valve 81 is communicated with the intake passage 11 at a position located upstream of the throttle valve 12, and a port 84 of the valve 81 is communicated with the intake passage 11 at a position located downstream of the throttle valve 12.

When the output interface circuit 42 receives the control output data which causes the opening degree of the control valve to increase or decrease, at the point 66 or 67 in the flow chart shown in FIG. 3 or 4, a driving signal having a high level or a low level is applied to the electromagnetic valve 80. Accordingly, atmospheric pressure or vacuum in the intake manifold is applied to a diaphragm chamber of the control valve 81 via the electromagnetic valve 80, and thus, the air flow rate passing through the ports 84 and 85 of the flow rate control valve 81 is controlled.

It will be apparent that a control valve coupled with an actuator composed of an electrical pulse motor can be used as the flow rate control mechanism 16. However, in the case where the flow rate control mechanism having a pulse motor type actuator or the flow rate control mechanism having a structure such as shown in FIG. 8 is adopted, it is necessary to modify the structure of the output interface circuit 42 shown in FIG. 2.

In the control procedure according to the flow chart of FIGS. 3 and 4, the operation flows from the point 50 to the point 54 can be operated independent of the remaining operation flows, so that the operation flows at the points 50 to 54 are repeated at a time interval longer than the time interval of the remaining operation flows.

As will be apparent from the foregoing illustration, according to the method of the present invention, whether the actual rotational speed of the engine is increasing or decreasing is judged, and then, the desired value of the rotational speed is adjusted in accordance with the actual value of the rotational speed and the result of the judgement. Therefore, even when the rotational speed of the engine is abruptly decreased, stalling of the engine can be prevented. Furthermore, good acceleration can be obtained when the rotational speed of the engine increases.

As many widely different embodiments of the present invention may be constructed without departing from the spirit and scope of the present invention, it will be understood that the present invention is not limited to the specific embodiments described in this specification, except as defined in the appended claims.

What is claimed is:

1. A method of controlling the rotational speed of an internal combustion engine having an intake passage, a throttle valve disposed in said intake passage, and a bypass passage which communicates said intake passage at a position located upstream of said throttle valve with said intake passage at a position located downstream of said throttle valve, said method comprising the steps of:

(a) providing a reference speed signal;

(b) providing a rotational speed signal having a value corresponding to the actual rotational speed of said engine;

(c) comparing said rotational speed signal and said reference speed signal;

(d) increasing the flow of air through said bypass passage and decreasing said reference speed signal by a predetermined value for use in providing a next reference speed signal when said rotational speed signal is equal to or less than said reference speed signal, and decreasing the flow of air through said bypass passage when said rotational speed signal is greater than said reference speed signal;

(e) repeating the steps (a), (b), (c) and (d) recited above at predetermined time intervals, whereby the difference between a respective rotational speed signal and a respective reference speed signal can be reduced.

2. The method as claimed in claim 1 and including the steps of determining from at least two of the rotational speed signals provided whether the rotational speed of the engine has decreased; and performing said step of decreasing said reference speed signal by said predetermined value when the rotational speed of the engine has decreased and when said rotational speed signal is equal to or less than said reference speed signal.

3. The method as claimed in claim 1 and including the steps of determining from at least two of the rotational speed signals provided whether the rotational speed of the engine has decreased; and maintaining said reference signal unchanged for use in providing a next reference signal when the rotational speed of the engine has decreased and when said rotational speed signal is greater than said reference speed signal.

4. The method as claimed in claim 1 and including the steps of;

comparing at least two of the rotational speed signals provided, a second of the two rotational speed signals being provided after a first of the two rotational speed signals has been provided;

increasing said reference speed signal for use in providing a next reference speed signal to a value which is lower by a predetermined value than said second rotational speed signal when the rotational speed of the engine has increased or remained the same and when said second rotational speed signal is less than said reference speed signal, and maintaining said reference speed signal without change for use in providing a next reference speed signal when the rotational speed of the engine has increased and when said second rotational speed signal is equal to or less than said reference speed signal.

5. The method as claimed in claim 4 wherein said predetermined value by which said reference speed signal is decreased when said rotational speed signal is equal to or less than said reference speed signal is determined in accordance with the value of an earlier reference speed signal provided before said reference speed signal is provided.

6. The method as claimed in claim 1, 2, 3, 4 or 5 wherein the value of each reference speed signal provided is restricted to be within predetermined values.

* * * * *

UNITED STATES PATENT AND TRADEMARK OFFICE
CERTIFICATE OF CORRECTION

PATENT NO. : 4,291,656 Page 1 of 2

DATED : September 29, 1981

INVENTOR(S) : Miyagi et al

It is certified that error appears in the above—identified patent and that said Letters Patent is hereby corrected as shown below:

Column 1, line 28, after "idling" change "conditiion" to --condition--.

Column 1, line 35, after "desired" change "valve" to --value--.

Column 2, line 37, after "illustrating" change "an engine" to --an example--.

Column 2, line 50, first word, change "upstram" to --upstream--.

Column 4, line 18, after "solid line" change "a" to --a--.

Column 4, line 46, after "line" change "b" to --b--.

Column 4, line 52, after "line" change "b" to --b--.

Column 4, line 53, change "a" to --a--.

Column 4, line 63, change "$N_f \leqq N_{f0}$" to --$N_f \lesseqqgtr N_{f0}$--.

Column 6, line 24, after "shown by" change "c" to --c--.

UNITED STATES PATENT AND TRADEMARK OFFICE
CERTIFICATE OF CORRECTION

PATENT NO. : 4,291,656

DATED : September 29, 1981

INVENTOR(S) : Miyagi et al

It is certified that error appears in the above—identified patent and that said Letters Patent is hereby corrected as shown below:

Column 6, line 29, change "d" to --d--.

Column 6, line 39, after "line" change "e" to --e--.

Column 6, line 55, change "b'" to --b'--.

Column 9, line 1, after "has" change "in-" to --de- --.

Signed and Sealed this

*Twenty-ninth* Day of *December 1981*

[SEAL]

*Attest:*

GERALD J. MOSSINGHOFF

*Attesting Officer* *Commissioner of Patents and Trademarks*